(12) United States Patent
Polden

(10) Patent No.: US 10,882,558 B2
(45) Date of Patent: Jan. 5, 2021

(54) ARRANGEMENT OF CENTRAL LOAD-CARRYING TUBE OF MOTOR VEHICLE CHASSIS WITH INTEGRATED ROTARY ELECTRIC MOTOR, METHOD OF ITS PLACEMENT AND USE

(71) Applicant: GI4 s.r.o., Prague (CZ)

(72) Inventor: Robin Polden, Prague (CZ)

(73) Assignee: GI4 S.R.O., Prague (CZ)

( * ) Notice: Subject to any disclaimer, the term of this patent is extended or adjusted under 35 U.S.C. 154(b) by 0 days.

(21) Appl. No.: 15/744,122

(22) PCT Filed: Apr. 4, 2016

(86) PCT No.: PCT/CZ2016/000035
§ 371 (c)(1),
(2) Date: Jan. 12, 2018

(87) PCT Pub. No.: WO2017/008770
PCT Pub. Date: Jan. 19, 2017

(65) Prior Publication Data
US 2018/0201321 A1    Jul. 19, 2018

(30) Foreign Application Priority Data
Jul. 15, 2015 (CZ) ..................... 2015-500

(51) Int. Cl.
| | |
|---|---|
| *B62D 21/04* | (2006.01) |
| *B60K 1/02* | (2006.01) |
| *B60K 1/00* | (2006.01) |
| *B60K 17/22* | (2006.01) |

(52) U.S. Cl.
CPC ............... *B62D 21/04* (2013.01); *B60K 1/00* (2013.01); *B60K 1/02* (2013.01); *B60K 17/22* (2013.01)

(58) Field of Classification Search
CPC .......... B62D 21/04; B60K 1/02; B60K 17/22; B60K 1/00
USPC ........................................................ 180/65.1
See application file for complete search history.

(56) References Cited

U.S. PATENT DOCUMENTS

| | | | | |
|---|---|---|---|---|
| 6,015,022 A | * | 1/2000 | Thuliez .................. | B62D 21/04 180/210 |
| 9,045,163 B2 | * | 6/2015 | Theodore ............... | B60K 17/22 |
| 2012/0217793 A1 | | 8/2012 | Drum et al. | |

FOREIGN PATENT DOCUMENTS

| | | |
|---|---|---|
| DE | 102005052307 A A1 | 5/2007 |
| FR | 2769876 A1 | 4/1999 |
| WO | 2013106049 A1 | 7/2013 |

* cited by examiner

*Primary Examiner* — John D Walters
(74) *Attorney, Agent, or Firm* — Daniel J. Honz; Advent, LLP

(57) ABSTRACT

Arrangement of central load-carrying tube of motor vehicle chassis with integrated rotary electric motor, method of its placement and use, wherein one or more rotary electric motors (1) are placed inside the tubular structure of the central tube (2) of vehicle chassis. Advantageously, the tubular structure of the central tube (2) of vehicle chassis is further fitted with traction components (5), (6) and (7), which, together with the rotary electric motor, form a compact unit. Use of central load-carrying tube (2) according to claims 1 to 6, fitted with rotary electric motor (1) and traction components, as a chassis of the road, commercial and military vehicles.

10 Claims, 2 Drawing Sheets

ARRANGEMENT OF CENTRAL LOAD-CARRYING TUBE OF MOTOR VEHICLE CHASSIS WITH INTEGRATED ROTARY ELECTRIC MOTOR, METHOD OF ITS PLACEMENT AND USE

TECHNICAL FIELD

The technical solution relates to a method of placement of the rotary electric motor into a central load-carrying tube of motor vehicle chassis, an arrangement of central load-carrying pipe of motor vehicle chassis with integrated rotary electric motor, and method of its placement and use.

BACKGROUND ART

Currently the propulsion of vehicles, whose chassis comprises a central load-carrying tube, is solved by a combustion unit, which is always located outside the central load-carrying tube.

The disadvantage of such solution is the poor control of the weight distribution on the vehicle axle, a higher center of gravity of the vehicle, problems with implementation of traction unit, risk of mechanical damage to the traction unit by external influences and higher losses of energy transfer.

Disclosure of the Invention

Said drawbacks are eliminated or substantially reduced in that the rotary electric motor, or multiple rotary electric motors are placed inside the central load-carrying tube. Chassis of a motor vehicle, comprising a central load-carrying tube, can be fitted with any number of rotary electric motors located inside the central load-carrying tube both before and behind the chassis axle. It can also be supplemented by other components such as a transmission, axle drive, clutch, differential, etc., if this is advantageous for a given application. The essence is that all the traction components were placed inside the tube and form compact unit together with the rotary electric motor.

The advantage of this solution is that the integration of one or multiple rotary electric motors inside the central load-carrying tube of the chassis, either alone or supplemented by other elements, creates a compact unit which, after coupling with an external power source and controlling the motor(s), is able to provide movement. Such chassis can be fitted with any superstructure or body. At the same time, even after applying one or multiple rotary electric motors, the torsional stiffness of the tubular structure of the central load-carrying tube is maintained.

BRIEF DESCRIPTION OF DRAWINGS

A central load-carrying tube provided inside with the integrated rotary electric motor is described in more detail on a specific example using the attached figures, where.

EXAMPLES OF EMBODIMENT OF THE INVENTION

Figure 1:
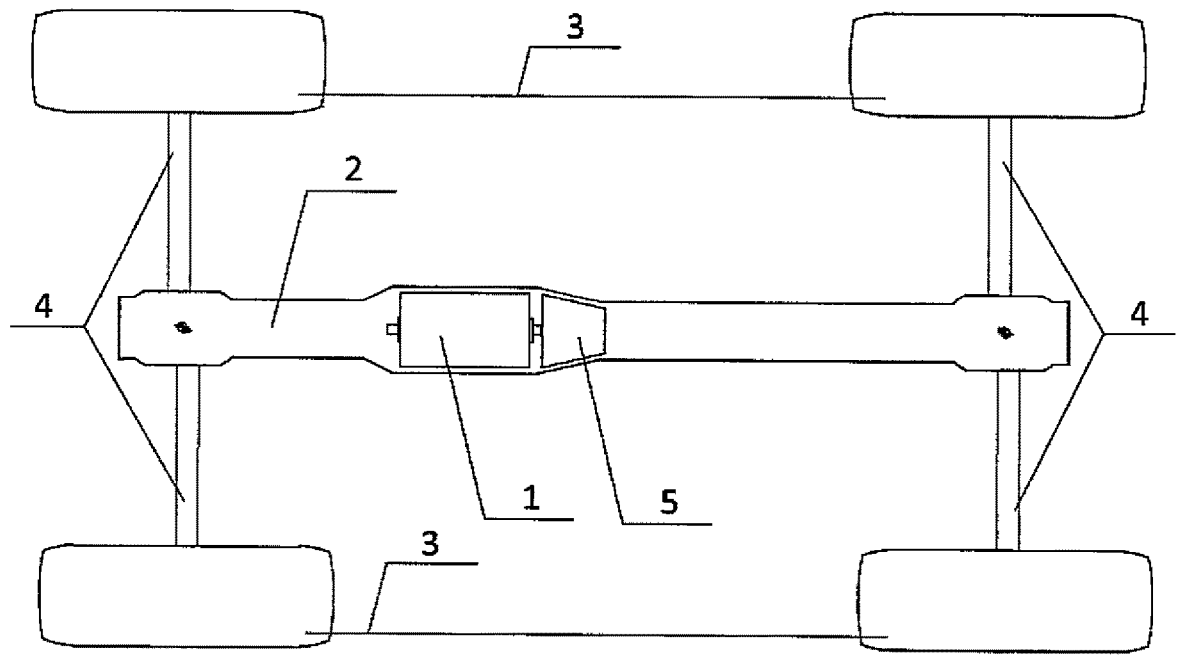
FIG. 1 is a schematic drawing of a central load-carrying tube with an integrated single rotating electric motor.
Figure 2:
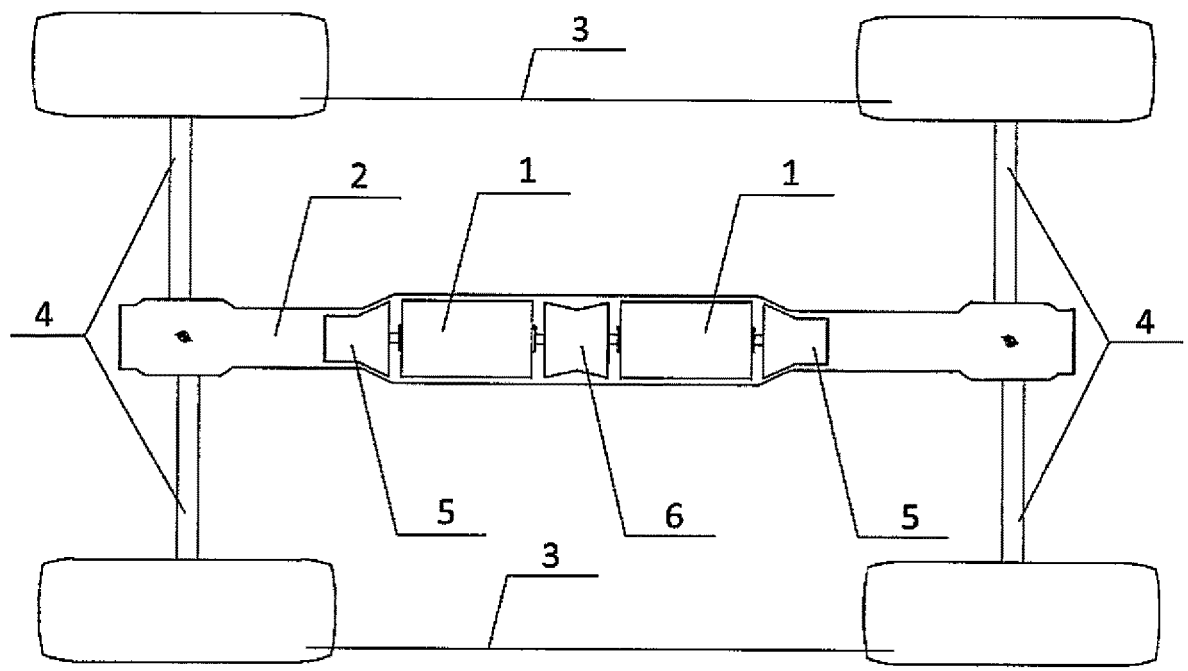
FIG. 2 is a schematic drawing of central load-carrying tube with two integrated rotary electric motors.

Device according to FIGS. 1 and 2 comprises a central load-carrying tube 2 fitted with two axles 4 with wheels 3, inside which are placed two rotary electric motors 1, between which a clutch 6 is placed, wherein transmissions/axle drives 5 are attached on the outer side of the rotary electric motors 1. The transmission/axle drive 5 and clutch 6 are not critical to the subject invention and need not to be placed in a central load-carrying tube. Conversely, the central load-carrying tube may contain more rotary electrical motors and/or other traction components, particularly transmissions/axle drives 5, clutches 6, differentials and downward gearings.

Figure 3:
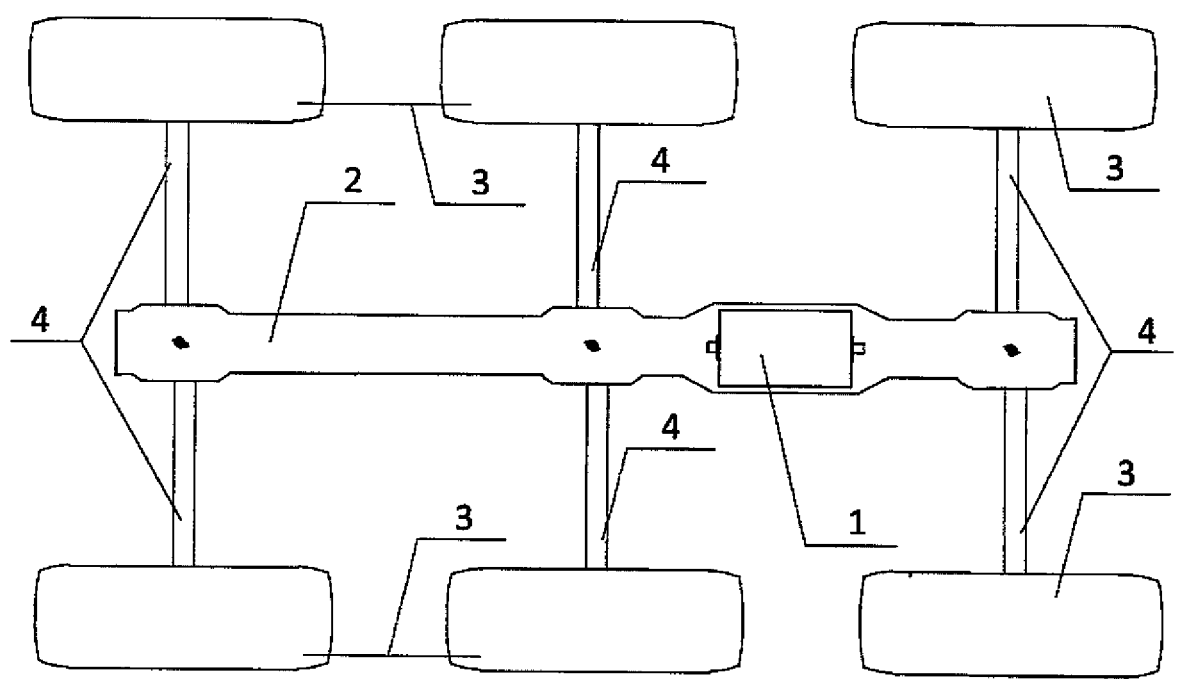
FIG. 3 is a schematic drawing of central load-carrying tube with one integrated rotary electric motor, where the tube is attached to several axles.

Device according to FIG. 3 consists of a central load-carrying tube 2 fitted with three axles 4 with wheels 3, wherein the rotary electric motor 1 is located inside the central load-carrying tube 2 between the second and third axle 4 with wheels 3. The number of rotary electric motors 1 placed inside the central load-carrying tube may vary, as well as the rotary electric motor 1 may be supplemented by additional traction components.

INDUSTRIAL APPLICABILITY

The central load-carrying tube with rotary electric motor integrated inside is intended for road, commercial and military vehicles. In general, this principle of central load-carrying tube is also usable in other kinds of vehicles, assuming of course that it is adapted to the respective type of vehicle.

The invention claimed is:

1. A system of a central load-carrying tube of a motor vehicle chassis, comprising:
   a central load-carrying tube having a tubular structure with a length along a longitudinal direction of the motor vehicle chassis, the central load-carrying tube having a circular cross-section along the entire length of the tubular structure; and
   at least one rotary electric motor placed inside and enclosed within the tubular structure of the central load-carrying tube of the motor vehicle chassis.

2. The system according to claim 1, characterized in that two or more rotary electric engines are placed inside the tubular structure of the central load-carrying tube of the motor vehicle chassis.

3. The system according to claim 2, characterized in that one or more traction components are further placed inside the tubular structure of the central load-carrying tube of the motor vehicle chassis.

4. The system according to claim 3, characterized in that the one or more traction components include at least one of a clutch, a transmission, an axle drive, or a differential.

5. The system according to claim 1, characterized in that one or more traction components are further placed inside the tubular structure of the central load-carrying tube of motor vehicle chassis.

6. The system according to claim 5, characterized in that the one or more traction components include at least one of a clutch, a transmission, an axle drive, or a differential.

7. Use of the system according to claim 1, fitted with rotary electric motor and traction components, as a chassis of a road vehicle.

8. A method of assembly of a central load-carrying tube of a motor vehicle chassis, characterized in that the central load-carrying tube having a circular cross-section along an entire longitudinal length of the central load-carrying tube is provided with at least one rotary electric motor that is placed inside and enclosed within the central load-carrying tube at least one of before or behind a chassis axle of the motor vehicle chassis.

9. The method of assembly of the central load-carrying tube of the motor vehicle chassis according to claim 8, the structure of central load carrying-tube characterized in that the central load-carrying tube is further provided with traction components including a transmission, axle drive, clutch, differential, and downward gearing, in a manner that all traction components are placed inside the central load-carrying tube and form a unit together with the rotary electric motor.

10. The method of assembly of the central load-carrying tube of the motor vehicle chassis according to claim 8, fitted with rotary electric motor and traction components, as a chassis of a road vehicle.

\* \* \* \* \*